United States Patent [19]

Egert et al.

[11] 4,368,231

[45] Jan. 11, 1983

[54] LAMINATED PLASTIC, ITS PRODUCTION AND ITS USE

[75] Inventors: Karl-Heinz Egert, Hamburg; Joachim Wank, Dormagen-Zons; Eckart Reese, Dormagen, all of Fed. Rep. of Germany

[73] Assignees: Messerschmitt-Bölkow-Blohm Gesellschaft mit beschrankter Haftung, Munich; Bayer Aktiengesellschaft-Bayerwerk, Leverkusen, both of Fed. Rep. of Germany

[21] Appl. No.: 241,366

[22] Filed: Mar. 6, 1981

[30] Foreign Application Priority Data

Mar. 15, 1980 [DE] Fed. Rep. of Germany ....... 3010143

[51] Int. Cl.³ .......................... B32B 27/00; C09J 3/12
[52] U.S. Cl. ................................... 428/220; 156/320;
156/331.7; 428/412; 428/419; 428/421;
428/422; 428/423.1; 428/424.2; 428/424.6;
428/921
[58] Field of Search ............... 428/412, 419, 421, 422,
428/921, 220, 423.1, 424.2, 424.6; 260/33.8 R,
33.6 R; 525/534, 462; 156/320, 331.7

[56] References Cited

U.S. PATENT DOCUMENTS

| 3,365,517 | 1/1968 | Barth | 525/534 X |
| 3,579,370 | 5/1971 | Punderson et al. | |
| 3,622,440 | 11/1971 | Snedeken et al. | 156/329 |
| 3,960,815 | 6/1976 | Darsow et al. | 260/33.8 R X |
| 4,121,014 | 10/1978 | Shaffer | 428/424.2 X |
| 4,228,219 | 10/1980 | Hoy et al. | 428/422 |
| 4,301,212 | 11/1981 | Cohnen et al. | 428/412 |

FOREIGN PATENT DOCUMENTS

| 12434 | 6/1980 | European Pat. Off. . |
| 2037028 | 2/1972 | Fed. Rep. of Germany . |
| 2444516 | 4/1975 | Fed. Rep. of Germany . |
| 2354210 | 7/1975 | Fed. Rep. of Germany . |

Primary Examiner—Thomas J. Herbert, Jr.
Attorney, Agent, or Firm—Toren, McGeady and Stanger

[57] ABSTRACT

Laminated plastic sheets composed of a first layer of a film of an aromatic thermoplastic polycarbonate or polyarylsulfone and a second layer of a film of a thermoplastic copolymer of tetrafluoroethylene and of a completely or partially fluorinated vinyl alkyl ether or vinylalkane and an interlayer of a polyurethane adhesive between the film layers to secure the film layers to one another. Also disclosed are methods for producing the laminated plastic sheet and articles formed therefrom. Such sheets and articles possess improved printability, thermo-formability, resistance to ignition and produce minimal smoke on burning.

12 Claims, No Drawings

LAMINATED PLASTIC, ITS PRODUCTION AND ITS USE

BACKGROUND OF THE INVENTION

1. Field of the Invention

The present invention relates to laminated plastic sheets and shaped articles formed therefrom. More particularly, the present invention relates to laminated plastics suitable as decorative elements and other constructional uses.

2. Description of the Prior Art

Laminated films are known in principle (see, for example, French patent specification No. 1,359,975). However, the previously known laminated plastics do not possess all of the desired properties, e.g., printability, thermo-formability, resistance to solvents, and resistance to ignition or gas and smoke production in the event of fire, often required in such materials.

SUMMARY OF THE INVENTION

We have discovered a new plastic laminate that possesses a particularly desirable combination or profile of properties. More particularly, the laminate of the present invention comprises a layer of a film of a polymer selected from the group consisting of an aromatic thermoplastic polycarbonate and a thermoplastic polyarylsulfone, a layer of a film of a thermoplastic copolymer of 40 to 60 mol % of ethylene, 40 to 60 mol % of tetrafluoroethylene and up to 10 mol %, based on the 100 mol % of the sum of ethylene and tetrafluoroethylene, of a completely or partially fluorinated vinyl alkyl ether or a completely or partially fluorinated vinylalkane, a layer of a polyurethane adhesive between the film layers and securing the film layers to one another.

DESCRIPTION OF THE PREFERRED EMBODIMENT

Laminated plastics in the context of the present invention are to be understood as sheet-like layered structures 0.05 to 5 mm thick.

The aromatic thermoplastic polycarbonates to be used according to the invention are known (see H. Schnell "Chemistry and Physics of Polycarbonates," Interscience Publishers, New York, 1964). Polycarbonate films are likewise known.

Thermoplastic aromatic polycarbonates which are suitable for the production of the polycarbonate films according to the invention can have weight-average molecular weights of between 25,000 and 200,000, preferably, between 30,000 and 80,000. (The Mw was determined by measuring $\eta_{rel}$ in $CH_2Cl_2$ at 20° C. and at a concentration of 0.5% by weight.)

Thermoplastic aromatic polycarbonates which are suitable according to the invention are, in particular, homopolycarbonates of 2,2-bis-(4-hydroxyphenyl)-propane (bisphenol A), and copolycarbonates of bisphenol A and up to 10 mol %, relative to the mols of bisphenol A, of other diphenols, and/or up to 0.5 mol %, relative to bisphenol A, of branching components with at least three branching points, for example, trisphenols or tetraphenols.

"Other diphenols" which are suitable are bis-(hydroxyaryl)-$C_1$-$C_8$-alkanes other than bisphenol A, and, in particular, bis-(hydroxyaryl)-$C_5$-$C_6$-cycloalkanes.

Examples of other diphenols which are suitable are bis-(4-hydroxyphenyl)-methane (bisphenol F), 2,4-bis-(4-hydroxyphenyl)-2-methylbutane, 2,2-bis-(3-methyl-4-hydroxyphenyl)-propane, bis-(3,5-dimethyl-4-hydroxyphenyl)-methane, 2,2-bis-(3,5-dimethyl-4-hydroxyphenyl)-propane, 2,4-bis-(3,5-dimethyl-4-hydroxyphenyl)-2-methylbutane, 1,1-bis-(4-hydroxyphenyl)-cyclohexane and 1,1-bis-(3,5-dimethyl-4-hydroxyphenyl)-cyclohexane.

Examples of suitable branching components are phloroglucinol, 1,3,5-tris-(4-hydroxyphenyl)-benzene, 1,1,1-tris-(4-hydroxyphenyl)-ethane, 3,3-bis-(4-hydroxyphenyl)-2-oxo-2,3-dihydroindole (isatin-bisphenol), 3,3-bis-(4-hydroxy-3-methylphenyl)-2-oxo-2,3-dihydroindole (isatin-bis-o-cresol), 2,2-bis-[4,4-bis-(4-hydroxyphenyl)-cyclohexyl]-propane, tetra-(4-hydroxyphenyl)-methane, tetra-[4-(4-hydroxyphenyl-isopropyl)-phenoxy]-methane and 1,4-bis-[(4',4"-dihydroxy-triphenyl)-methyl]-benzene. Preferred suitable branching components are isatin-bisphenol, isatin-bis-o-cresol and 1,4-bis-[(4',4"-dihydroxytriphenyl)-methyl]-benzene.

Polycarbonates which are preferred and suitable, according to the invention, are copolycarbonates of 99 to 90 mol % of 2,2-bis-(4-hydroxyphenyl)-propane and 1 to 10 mol % of 1,1-bis-(4-hydroxyphenyl)-cyclohexane.

Particularly suitable branched polycarbonates are those disclosed in German Offenlegungsschrift No. 2,254,917 (Le A 14 719), German Offenlegungsschrift No. 2,500,092 (Le A 16 142), German Offenlegungsschrift No. 2,113,347 (Le A 13 638) and German Offenlegungsschrift No. 2,254,918 (Le A 14 711). The polycarbonates disclosed in German Offenlegungsschriften Nos. 2,500,092 and 2,113,347 are preferred.

Preferred polycarbonate films are those which have been rendered low-burning in the customary manner. This is particularly accomplished by the addition of halogen-containing low-molecular aromatic polycarbonates which have mean molecular weights $\overline{Mn}$ (number-average) of 4,000 to 20,000, preferably, 8,000 to 12,000, and are based on halogenated diphenols. Examples of such materials are 2,2-bis-(3,5-dibromo-4-hydroxyphenyl)-propane or 2,2-bis-(3,5-dichloro-4-hydroxy-phenyl)-propane as disclosed in German Offenlegungsschrift No. 2,354,533 or German Offenlegungsschrift No. 2,243,226. This can be accomplished by the addition of $NH_4$ salts, alkali metal salts or alkaline earth metal salts of perhalogeno-alkanesulfonic acids, such as, for example, those of formula I $$R-SO_3-Me \qquad (I)$$

wherein
R represents $C_nHal_{2n+1}$
in which Hal represents F or Cl, preferably F, and n is 1 to 8, and
Me represents $NH_4$, an alkali metal, such as, for example, lithium, sodium or potassium, or an alkaline earth metal, such as, for example, magnesium, calcium, strontium or barium, and preferably,
Me is potassium.

More detailed information on the latter low-burning polycarbonate films can be found in German Offenlegungsschrift No. 2,706,126.

Polyarylsulfones suitable for use in the present invention are also known. They can be linear (see German Offenlegungsschrift No. 2,735,144) or branched (see German Offenlegungsschrift No. 2,735,092 or German Offenlegungsschrift No. 2,305,413).

Suitable linear polyarylsulfones are all of the known aromatic polysulfones or polyether-sulfones with an $\overline{M}w$ (weight-average molecular weight measured, for example, by means of light scattering) of between about 15,000 and 55,000 and preferably, between about 20,000 and about 40,000. Such polyarylsulfones are described, for example, in German Offenlegungsschrift No. 1,719,244 and U.S. Pat. No. 3,365,517.

Preferred suitable polyarylsulfones are those which which are obtainable from bisphenols and dihalogenoarylsulfones and which contain the following structural units of formula II

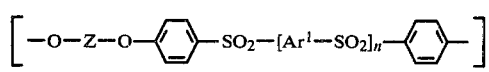

wherein $Ar^1$ denotes a biphenylene or oxybiphenylene radical, n denotes 0 or 1 and Z denotes a p-phenylene radical or m-phenylene radical or a divalent radical of the following formula III

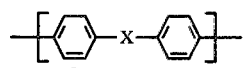

wherein

X denotes a divalent $C_1$-$C_{12}$-alkylene or $C_1$-$C_{12}$-alkylidene radical, $C_5$-$C_{12}$-cycloalkylene or $C_5$-$C_{12}$-cycloalkylidene radical, $C_7$-$C_{12}$-aralkylene or $C_7$-$C_{12}$-aralkylidene radical or $C_8$-$C_{12}$-arylenebisalkylidene radical or the grouping —O—, —S—, —SO—, —SO$_2$— or —CO—, or a single bond.

Suitable branched polyarylsulfones are, in particular, the branched polyaryl ether sulfones according to German Offenlegungsschrift No. 2,305,413 and U.S. Pat. No. 3,960,815. The $\overline{M}w$ (weight-average molecular weight, measured, for example, by means of light scattering) of these compounds are between about 15,000 and about 50,000, and preferably, between about 20,000 and 40,000.

Suitable adhesives based on polyurethane are, in particular, adhesives which are stable to heat and which, for example, achieve a high stability as a result of cross-linking during the thermoforming of the films.

Suitable adhesives based on polyurethane include, for example, reaction products of:

1. polyesters and diisocyanates which are obtained by a procedure in which:
   1.1 polyesters of dicarboxylic acids with 5 to 30 C atoms, preferably adipic acid, and of diols with 2 to 20 C atoms, preferably diethylene glycol, are prepared by known processes and
   1.2 these polyesters are reacted with diisocyanates, preferably 4,4'-diisocyanatodiphenylmethane, in a known manner to give the corresponding polyurethane.
   1.3 This reaction is carried out in a manner such that the resulting polyurethanes:
      1.3.1 have a free NCO content of 0.5 to 10% by weight, preferably, 0.5 to 5% by weight, or
      1.3.2 have an OH content of 0.5 to 15% by weight, preferably, 0.5 to 5% by weight,
or reaction products of 2. polyethers and diisocyanates which are obtained by a process in which
   2.1 a preferred polyether is polypropylene oxide, and
   2.2 these polyethers are reacted in a known manner with the diisocyanates mentioned under 1.2, and the reaction is carried out such that either
   2.3 polyurethanes with a free NCO content of 0.5 to 10% by weight, preferably 0.5 to 5% by weight, are obtained, or
   2.4 polyurethanes with a free OH content of 0.5 to 15% by weight, preferably 0.5 to 5% by weight, are obtained.

The polyurethane adhesives described can be cured in order to increase their heat stability.

This curing procedure is carried out by reacting the polyurethane adhesives mentioned under 1.3.1 or 2.3 with diols or amine-containing epoxide resins in a known manner, or by reacting the polyurethane adhesives mentioned under 1.3.2 or 2.4 with isocyanates, preferably, triisocyanates, in a known manner. Examples of suitable triisocyanates are those which can be obtained by reacting 1 mol of trimethylolpropane with 3 mols of an isomer mixture of 2,4- and 2,6-diisocyanatotoluene.

Copolymers of ethylene and tetrafluoroethylene and, if appropriate, vinyl alkyl ethers or vinylakanes, are likewise known. The copolymers to be used should have mean weight-average molecular weights $\overline{M}w$ (measured by gel chromatography methods) of between 50,000 and 150,000. The proportions of the individual monomers in the copolymer should be as follows:

between 40 and 60 mol % of ethylene, between 60 and 40 mol % of tetrafluoroethylene, and up to 10 mol %, in each case based on 100 mol % of the sum of ethylene and tetrafluoroethylene, of a completely or partially fluorinated vinyl alkyl ether or of a completely or partially fluorinated vinylalkane.

Suitable fluorinated vinyl alkyl ethers are perfluoromethyl vinyl ether and perfluoropropyl vinyl ether. An example of a suitable fluorinated vinylalkane is hexafluoropropene.

The laminated plastic according to the invention is produced in a known manner, for example, by applying the polyurethane adhesive to the films of aromatic thermoplastic polycarbonates and/or of thermoplastic polyarylsulfones in a known manner and, after the adhesive has dried, the film of the thermoplastic copolymer of ethylene, tetrafluoroethylene and the third component is applied after appropriate, customary pre-treatment.

After being bonded together, the laminated plastics can also be reinforced by extruding a further layer of polycarbonate onto the surface.

The laminated plastics according to the present invention have a surprisingly good profile of properties, since they are easily printable and are thermo-formable up to an H/D deformation ratio of 3:1. Also, they are abrasion-resistant, dirt-repellent, easy to clean, insensitive towards the effects of solvents on the surface and difficult to ignite or self-extinguishing (burning test in accordance with FAR 25-853, method a) without toxic gases being split off in the case of fire (in accordance with Draft Regulation ATS 1000.001) and they can easily be stuck to other construction elements.

The laminated plastics according to the invention are thus preferably used as decorative elements, for example, in the construction of road vehicles, aircraft, ships or rolling stock.

The present invention thus also relates to the use of the laminated plastics according to the invention as decorative elements.

The laminated plastics hitherto employed as decorative layers do not have optimum properties either with regard to their formability or with regard to the evolution of gas or smoke in the case of fire.

EXAMPLE 1

A 300 μm thick film is produced in a flat film installation from a polycarbonate which is obtained from 2,2-bis-(4-hydroxyphenyl)-propane and has a $\eta_{rel}$ of 1.42 (measured in $CH_2Cl_2$ at 25° C. and at a concentration c of 0.5 g/100 ml) and contains 1% by weight of potassium perfluorobutanesulfonate (according to German Offenlegungsschrift No. 2,706,126). This film is coated on a laminating installation with an adhesive which is heat-stable and is based on adipic acid/diethylene glycol and 4,4'-diisocyanatodiphenylmethane (Liofol UK 3645, 74% strength solution in ethyl acetate, viscosity: 390 $cP_{20}$, NCO content: 2% by weight), and which has been mixed with a curing agent based on an amine-containing epoxide resin (Liofol UK 6200, 62% strength solution in cyclohexane (84.2%) and methyl ethyl ketone (15.8%), viscosity: 25 $cP_{20}$) in a ratio of 10:1 and which has been diluted to a viscosity of 25 seconds (Ford cup, 4 mm nozzle) with ethyl acetate. The adhesive is applied with a reverse roll coater. The adhesive applied to the polycarbonate film is dried in a drying tunnel at about 80° C., all of the solvent being removed.

At the end of the drying tunnel, a 100 μm thick polyolefine film ($\overline{M}w$ of the polyolefine: 100,000 measured by means of gel chromatography) of an ethylene/tetrafluoroethylene (50 mol %/50 mol %) copolymer, which is pretreated on one side and which contains 10 mol % (based on 100 mol % of the sum of ethylene and tetrafluoroethylene) of hexafluoropropene and, on the pre-treated side, has a surface tension of 48 dynes/cm, is passed through a laminating station, together with the polycarbonate film coated with adhesive, in which the pretreated side of the polyolefine film comes together with the adhesive-coated side of the polycarbonate film. The two films are pressed together under a linear pressure of 8 kg/cm at a temperature of 70° C. and the resulting laminated film is then wound up. The machine speed is set at 25 m/minute.

After storage for 4 days at 50° C., this laminated film can be further processed. To produce shaped articles, the laminated film is shaped on a vacuum-forming machine at temperatures between 190° and 220° C. in a manner which is known per se, the film being inserted such that the polycarbonate side, which is later to be bonded to the construction elements, faces the mold when a positive mold is used.

EXAMPLE 2

A laminated film is produced according to Example 1 using a 100 μm thick polycarbonate film (polycarbonate of Example 1) and a 100 μm thick film of an ethylene/-tetrafluoroethylene copolymer (50 mol %/50 mol %) containing 10 mol %, based on 100 mol % of ethylene/-tetrafluoroethylene, of vinyl methyl ether ($\overline{M}w$ of the copolymer: 100,000 measured by means of gel chromatography).

To produce a laminated plastic 3 mm thick, this laminated film is allowed to run into the nip of a polycarbonate sheet-production installation, in which the polycarbonate side of the laminated film comes into contact with the still liquid melt of the polycarbonate and is intimately combined therewith and the laminate is drawn off via a chill-roll installation. The thickness of the resulting laminated plastic is determined by the nip of the take-off rollers. The laminate thus produced, which consists of a laminated film 0.2 mm thick and 2.8 mm of polycarbonate, can be shaped in the manner described in Example 1.

EXAMPLE 3

A laminated film is produced as in Example 1, with the exception that the polyurethane adhesive used is a polyether-urethane adhesive based on polypropylene oxide with a hydroxy content of 3 to 4% by weight, which is mixed with a catalyst consisting of an aromatic diisocyanate (for example, 4,4'-diisocyanatodiphenylmethane, Desmodur KA 8090) in a ratio of 10:1.

EXAMPLE 4

A laminated film is produced as in Example 1, the polycarbonate film used (polycarbonate of Example 1) being a 200 μm thick polycarbonate film containing 1% of potassium perfluorobutanesulfonate (according to German Offenlegungsschrift No. 2,706,126) and the partially fluorinated polyolefine film used being a 0.05 mm thick ethylene/tetrafluoroethylene copolymer film (50 mol %/50 mol %) which contains 5% of tetrafluoropropene ($\overline{M}w$ of the copolymer: 100,000 measured by means of gel chromatography). This laminated film is provided with a decorative print on the polycarbonate side. The printed film is attached to the construction element of a window element of an airliner by warming the printed film to 190° to 200° C. on a thermoforming machine with infrared radiators and sucking the still plastic film onto the construction element by vacuum. The bonding between the laminated film and the construction element is effected with the aid of a hot-melt adhesive present on the construction element.

EXAMPLE 5

A laminated film is produced according to Example 1, but a polyarylsulfone film of polyarylsulfone ($\overline{M}w$ 50,000 measured by means of light scattering), which is prepared in the known manner from bisphenol A and 4,4'-dichlorodiphenylsulfone, is used instead of a polycarbonate film.

EXAMPLE 6

A laminated film is produced according to Example 1, but a film of a mixture of 70% by weight of polyarylsulfone of Example 5 and bisphenol A polycarbonate ($\overline{M}w$ 75,000 measured by means of light scattering) (according to German Offenlegungsschrift No. 2,735,144) is used instead of a film composed purely of polycarbonate, the mixed polycarbonate/polyarylsulfone film being 0.3 mm thick and the polyolefine film being 0.03 mm thick.

What is claimed is:

1. A laminated plastic sheet having a thickness of 0.05 to 5 mm comprising a layer of a film of aromatic thermoplastic polycarbonate or thermoplastic polyarylsulfone, a layer of a film of a thermoplastic copolymer of 40 to 60 mol % of ethylene, 60 to 40 mol % of tetrafluoroethylene and from 0 to 10 mol %, based on 100 mol % of the sum of ethylene and tetrafluoroethylene, of a completely or partially fluorinated vinyl alkyl ether or of a completely or partially fluorinated vinylalkane, and a layer of a polyurethane adhesive between said film layers to secure the film layers to one another.

2. The laminated plastic of claim 1 wherein the fluorinated vinyl alkyl ether is perfluoromethyl vinyl ether, or perfluoropropyl vinyl ether.

3. The laminated plastic of claim 1 wherein the fluorinated vinylalkane is hexafluoropropene.

4. An article formed from the sheet of claim 1.

5. The laminated plastic of claim 1 in which the polycarbonate is a copolycarbonate of 99 to 90 mol % of 2,2-bis-(4-hydroxyphenyl)-propane and 1 to 10 mol % of 1,1-bis-(4-hydroxyphenyl)-cyclohexane.

6. The laminated plastic of claim 1 or 5 in which the flammability of the polycarbonate has been decreased by the addition of an effective amount of a halogen-containing low-molecular aromatic polycarbonate which has a molecular weight $\overline{M}_n$ of 4,000 to 20,000 and is based on a halogenated diphenyl or by the addition of an $NH_4$ salt, alkali metal salt or alkaline earth metal salt of a perhalogenoalkanesulfonic acid.

7. The laminated plastic of claim 1 or 5 in which the polyarylsulfone has been obtained from a bisphenol and a dihalogenoarylsulfone and contains structural units of the general formula

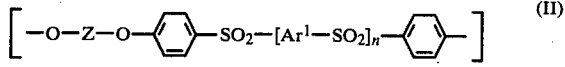

(II)

in which
Ar$^1$ is a biphenylene or oxybiphenylene radical,
n is 0 or 1, and
Z is a p-phenylene, m-phenylene radical or a radical of the general formula

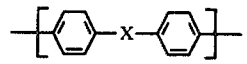

(III)

in which
X is a divalent $C_1$–$C_{12}$-alkylene group,
a $C_1$–$C_{12}$-alkylidene group,
a $C_5$–$C_{12}$-cycloalkylene group,
a $C_5$–$C_{12}$-cycloalkylidene group,
a $C_7$–$C_{12}$-aralkylene group,
a $C_7$–$C_{12}$-aralkylidene group,
a $C_8$–$C_{12}$-arylene-bis-alkylidene group,
—O—, —S—, —SO—, —SO$_2$—, —CO— or a single bond.

8. The laminated plastic of claim 1 wherein the polyurethane adhesive is selected from the group consisting of polyurethanes having a free isocyanate content between about 0.5 to 10% by weight and a hydroxyl content between about 0.5 to 15% by weight.

9. The adhesive of claim 8 wherein the polyurethane adhesive is a reaction product of
(a) polyesters prepared from the reaction of dicarboxylic acids with 5 to 30 carbon atoms and diols with 2 to 30 carbon atoms; and
(b) a diisocyanate.

10. The adhesive of claim 9 wherein the polyester is a diethylene glycol and the diisocyanate is 4,4'-diisocyanato-diphenylmethane.

11. The adhesive of claim 8 wherein the polyurethane adhesive is a reaction product of a polyether and a diisocyanate.

12. The adhesive of claim 11 wherein the polyether is polypropylene oxide.

* * * * *